D. R. HOLDEN.
FERTILIZER DISTRIBUTER.
APPLICATION FILED APR. 6, 1917.
1,285,183.
Patented Nov. 19, 1918.
2 SHEETS—SHEET 1.
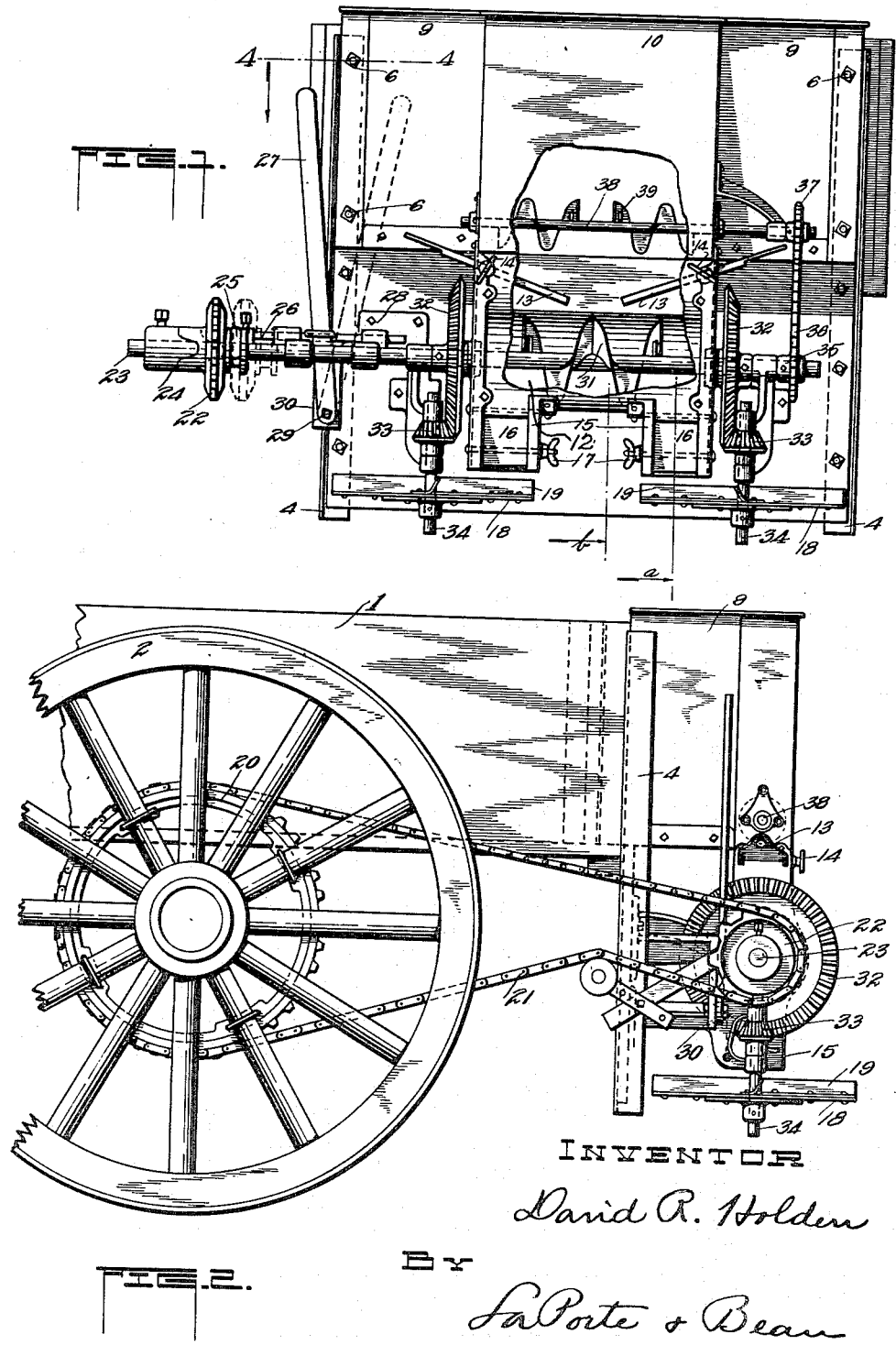
INVENTOR
David R. Holden
BY
LaPorte & Bean
ATTYS D. R. HOLDEN.
FERTILIZER DISTRIBUTER.
APPLICATION FILED APR. 6, 1917.
1,285,183.
Patented Nov. 19, 1918.
2 SHEETS—SHEET 2.
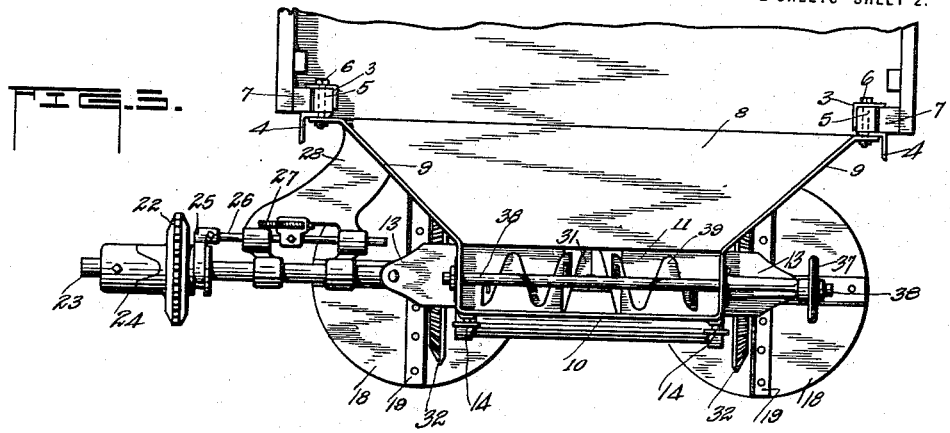
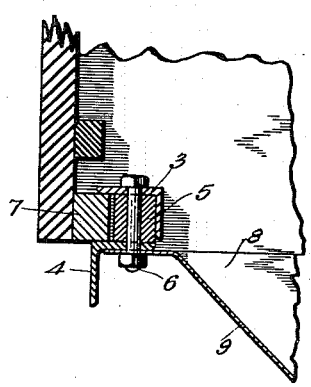
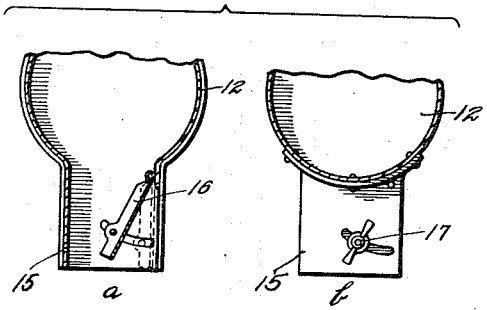
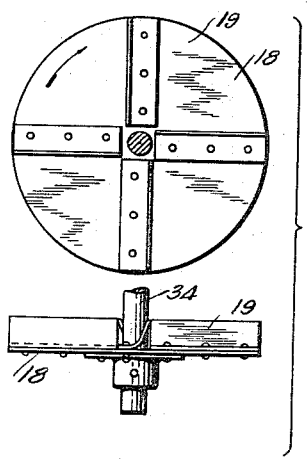
INVENTOR
David R. Holden
By
LaPorte & Bean
ATTYS

UNITED STATES PATENT OFFICE.

DAVID R. HOLDEN, OF PEORIA, ILLINOIS.

FERTILIZER-DISTRIBUTER.

REISSUED

1,285,183.

Specification of Letters Patent.

Patented Nov. 19, 1918.

Application filed April 6, 1917. Serial No. 160,107.

*To all whom it may concern:*

Be it known that I, DAVID R. HOLDEN, a citizen of the United States, a resident of Peoria, in the county of Peoria and State of Illinois, have invented new and useful Improvements in Fertilizer-Distributers, of which the following is a specification.

My invention relates to improvements in fertilizer distributers, and one of the objects is the provision of such a device which may be readily attached to the rear of a wagon, which is low down, and therefore easy on the operator, having the bottom flush with the floor of the wagon, and having means for positively distributing the material over a wide area, located close to the ground so as to obtain most efficient results.

Another object of this invention is the provision in such a mechanism of a frame work adapted to be supported on the rear end of a wagon, with the receiving surface flush with the floor of the wagon, having a hopper with suitably controlled openings leading to broadcast distributing means or parts, all being operated from the wheel of the wagon.

Further objects include improvements in details of construction and arrangement, whereby an efficiently operating mechanism is provided.

In the drawings:—

Figure 1 represents a rear elevation of a mechanism constructed according to my invention, mounted on the end of a wagon, parts being broken away to facilitate the disclosure;

Fig. 2 is a side elevation of the rear part of a wagon, with a mechanism constructed according to my invention mounted thereon;

Fig. 3 is a top plan view of the mechanism shown in Fig. 1;

Fig. 4 is a detail sectional view on line 4—4 of Fig. 1, shown on an enlarged scale to illustrate the manner of mounting the attachment on a wagon;

Fig. 5 is a vertical section on line $a$ and on line $b$, respectively, of Fig. 1;

Fig. 6 is a top plan view and side elevation, respectively, of one of the distributing members.

Referring now to the drawings, the numeral 1 designates the body of the wagon having the usual wheel 2. My invention is designed to be made in the form of an attachment to be made on the rear ends of wagons, but of course, the wagons may be constructed with the mechanism permanently in position, if desired. The frame work of the mechanism includes the vertically arranged angle members 3 and the additional angle members 4, having mounted therebetween the spacing bar members 5, the securing bolts 6 passing therethrough. These angle members 3 and 4 are spaced apart and so arranged as to embrace the end cleat 7 of the wagon body, so that in mounting the mechanism in position, it is only necessary to lift it high enough so that the spaced angle members 3 and 4 can pass over the upper end of the end cleat 7. It will then drop by gravity to its proper position and will be securely held and supported there. The angle iron members 4 extend a considerable distance below the floor of the wagon so as to support the operating parts of the mechanism, as will presently be described.

The body of the device includes the bottom member 8 which is arranged so as to be flush with the floor of the wagon when the device is in position. The body member also has the side portions 9 which are attached to the angle iron supporting members and also the end portion 10, this being reduced somewhat, due to the converging of the side members 9. The bottom member 8 does not extend entirely to the end member 10, leaving the elongated opening 11, which forms the discharge passage for the material into the hopper or receptacle 12, which is positioned therebelow. Cut-off plate members 13 are positioned so as to be adjusted to vary the opening into said hopper or receptacle, being held in proper position by means of the set-screws or thumb-nuts 14.

This hopper or receptacle 12 is provided with the spouts 15 in each end. These spouts have the swinging valve 16 adjustable by means of the bolt and nut connection 17 as shown, and are positioned so as to discharge the material on the broadcast distributing means, which take the form of the circular fans 18. These fans have the vanes 19 mounted thereon, which are provided with the securing portion and the upwardly extending throwing portions, the vanes being curved instead of angle formation, so as to prevent sticking of the material thereto.

This mechanism is adapted to be operated from the wheel of the vehicle which has mounted thereon, the sprocket 20 from which chain 21 runs to the sprocket 22 loosely, and slidably mounted on the driving shaft 23, this driving shaft extending across the mechanism. The hub of the sprocket 22 is constructed so as to form part of a clutch 24 and the sprocket is moved by means of the yoke 25 on the rod 26 and the movable lever 27 connected thereto, the rod 26 being slidable in the bracket 28 and the lever 27 having the pivotal connection 29 from below, with the arm or bracket 30 depending therefrom.

The shaft extends through the hopper or receptacle and is provided therein with the conveyer vanes 31 which are oppositely arranged so as to convey material from the middle of the mechanism to the spouts. Positioned on the outside of the hopper or receptacle are the driving bevel gears 32 in mesh with the bevel pinions 33 on the upright shafts 34 to which distributing fans 18 are attached. These parts are geared so that the fans will be rotated oppositely to each other so as to throw the material outwardly over as large an area as possible.

On the end of shaft 23 I mount the sprocket 35 from which chain 36 extends to sprocket 37 on the agitator shaft 38, which passes through the body of the mechanism above the opening 11, being provided with the vanes or other suitable agitating means 39, so as to prevent the material from caking about the opening 11. It is to be noted that I have provided a mechanism which can be readily attached to existing forms of wagons fitting tightly over the end cleats and being of light construction, so that its mounting may be readily accomplished. The bottom 8 is flush with the floor of the wagon so that the material may be easily shoveled into the discharge passage, where it is operated on by the agitating means, and discharged into the hopper or receptacle, the rate of discharge being controlled by the position of the cut-off plate members 13. The conveyer 31 feeds the material to the discharge spouts and the passage of the material through these spouts is controlled by the valve member 16. The distributing fans throw or spread the material over a large area and are located comparatively close to the ground, so that none of the material is wasted by blowing away.

The mechanism is so arranged that material composed of particles of comparatively large size may readily pass through the same and provision is made for the use of wet or damp material just as well as for dry material.

What I claim is:—

1. A mechanism of the character described adapted to be attached to the rear end of a wagon including a frame, a body having a bottom adapted to be positioned flush with the floor of the wagon, a receptacle located therebelow, said bottom having an opening leading to said receptacle, a plurality of distributing means located below the hopper, said hopper having spouts adapted to direct material to the distributing means, and means for rotating said distributing means.

2. A mechanism of the character described adapted to be attached to the rear end of a wagon including a frame, a body having a bottom adapted to be positioned flush with the floor of the wagon, a receptacle located therebelow, said bottom having an opening leading to said receptacle, a plurality of distributing means located below the hopper, said hopper having spouts adapted to direct material to the distributing means, means for rotating said distributing means, and means for controlling the passage of material from said body into said hopper.

3. A mechanism of the character described adapted to be attached to the rear end of a wagon including a frame, a body having a bottom adapted to be positioned flush with the floor of the wagon, a receptacle located therebelow, said bottom having an opening leading to said receptacle, a plurality of distributing means located below the hopper, said hopper having spouts adapted to direct material to the distributing means, means for rotating said distributing means, and agitating means in said body above said opening.

4. A mechanism of the character described adapted to be attached to the rear end of a wagon including a frame, a body having a bottom adapted to be positioned flush with the floor of the wagon, a receptacle located therebelow, said bottom having an opening leading to said receptacle, a plurality of distributing means located below the hopper, said hopper having spouts adapted to direct material to the distributing means, means for rotating said distributing means, and conveying means in said hopper to deliver the material to said spouts.

5. A mechanism of the character described adapted to be attached to the rear end of a wagon including a frame, a body having a bottom adapted to be positioned flush with the floor of the wagon, a receptacle located therebelow, said bottom having an opening leading to said receptacle, a plurality of distributing means located below the hopper, said hopper having spouts adapted to direct material to the distributing means, means for rotating said distributing means, and means for regulating the amount of material discharged through said spouts.

6. A mechanism of the character described, adapted to be mounted on the rear end of a wagon, including a frame, a body having a bottom adapted to be positioned flush with the floor of the wagon, a hopper located below the bottom, the bottom having an opening leading to said hopper, a plurality of distributing means located below said hopper, said hopper having spouts leading to said distributing means, an operating shaft passing through said hopper and having gears for operating said distributing means, and a conveyer mounted on said shaft within the hopper for feeding the material to the spouts.

7. A mechanism of the character described, adapted to be mounted on the rear end of a wagon, including a frame, a body having a bottom adapted to be positioned flush with the floor of the wagon, a hopper located below the bottom, the bottom having an opening leading to said hopper, a plurality of distributing means located below said hopper, said hopper having spouts leading to said distributing means, an operating shaft passing through said hopper and having gears for operating said distributing means, a conveyer mounted on said shaft within the hopper for feeding the material to the spouts, an agitator mounted in the body above the opening, and connections between said shaft and said agitator for driving the same.

8. A mechanism of the character described, adapted to be mounted on the rear end of a wagon, including a frame, a body having a bottom adapted to be positioned flush with the floor of the wagon, a hopper located below the bottom, the bottom having an opening leading to said hopper, a plurality of distributing means located below said hopper, said hopper having spouts leading to said distributing means, an operating shaft passing through said hopper and having gears for operating said distributing means, a conveyer mounted on said shaft within the hopper for feeding the material to the spouts, said shaft having clutch connections adapted to be operated by means from the wagon wheel.

9. A mechanism of the character described, including in combination, a frame and a body, distributing means located beneath the body and comparatively close to the ground, means for conveying material from said body to said distributing means, means for actuating the distributing means, said frame having portions spaced apart so as to embrace the end cleats of a wagon body for detachably mounting the whole mechanism on the rear end of a wagon.

10. In a mechanism of the character described, including in combination, a frame having a body mounted thereon, said frame having portions spaced apart so as to embrace the end cleats of a wagon body, distributing means located beneath the body and comparatively close to the ground, means for conveying material from said body to said distributing means, means for actuating the distributing means, said body having a bottom adapted to be positioned flush with the floor of a wagon.

11. In a mechanism of the character described, including in combination, a frame having a body mounted thereon, said frame including a plurality of angle members spaced apart so as to receive the end cleats of a wagon body, distributing means located beneath the body and comparatively close to the ground, means for conveying material from said body to said distributing means, means for actuating the distributing means, said body having a bottom adapted to be positioned flush with the floor of a wagon.

12. An apparatus of the character described adapted to be mounted on the rear end of a wagon, including spaced supporting frame parts adapted to embrace a cleat of the wagon body, a body having a bottom adapted to be positioned substantially flush with the floor of the wagon, a hopper, said bottom having an opening leading to said hopper, and distributing means located below said hopper and means to operate said distributing means.

13. In a mechanism of the character described, including in combination, a frame having a body supported thereby, said frame having portions spaced apart so as to embrace the end cleats of a wagon body for detachably supporting the whole mechanism on the rear end of a wagon, distributing means located beneath the body, means for conveying material from said body to said distributing means and means for actuating the distributing means.

14. A mechanism of the character described, including in combination, a frame and a body supported thereby, said frame including angle members arranged in pairs and spaced apart so as to embrace the end cleats of a wagon body, distributing means, means for conveying material from said body to said distributing means, and means for actuating said distributing means.

DAVID R. HOLDEN.